(12) United States Patent
Reubeuze

(10) Patent No.: US 7,828,385 B2
(45) Date of Patent: Nov. 9, 2010

(54) ARTICULATION MECHANISM WITH PIVOTING LOCKING ELEMENTS FOR A VEHICLE SEAT AND A SEAT COMPRISING SUCH A MECHANISM

(75) Inventor: Yann Reubeuze, Landigou (FR)

(73) Assignee: Faurecia Sieges d'Automobile, Nanterre (FR)

( * ) Notice: Subject to any disclaimer, the term of this patent is extended or adjusted under 35 U.S.C. 154(b) by 39 days.

(21) Appl. No.: 12/366,269

(22) Filed: Feb. 5, 2009

(65) Prior Publication Data

US 2010/0033004 A1  Feb. 11, 2010

(30) Foreign Application Priority Data

Feb. 6, 2008  (FR)  .................... 08 50763

(51) Int. Cl.
B60N 2/02 (2006.01)
(52) U.S. Cl. ...................... 297/366; 297/367
(58) Field of Classification Search ............... 297/366, 297/367
See application file for complete search history.

(56) References Cited

U.S. PATENT DOCUMENTS

| | | | |
|---|---|---|---|
| 5,161,856 A * | 11/1992 | Nishino | 297/367 R |
| 6,024,410 A | 2/2000 | Yoshida | |
| 6,039,400 A * | 3/2000 | Yoshida et al. | 297/367 R |
| 6,149,235 A | 11/2000 | Fahim | |
| 6,439,663 B1 * | 8/2002 | Ikegaya | 297/367 R |
| 6,666,515 B2 * | 12/2003 | Asano et al. | 297/366 |
| 7,150,502 B2 * | 12/2006 | Toba et al. | 297/367 R |
| 7,578,557 B2 * | 8/2009 | Becker et al. | 297/367 R |
| 7,677,666 B2 * | 3/2010 | Grable | 297/366 |

FOREIGN PATENT DOCUMENTS

WO  WO 00/06414  2/2000

OTHER PUBLICATIONS

French Preliminary Search Report and Written Opinion from counterpart application No. FR 08 50763; Report dated Sep. 19, 2008.

* cited by examiner

Primary Examiner—Sarah B McPartlin
(74) Attorney, Agent, or Firm—Miller, Matthias & Hull

(57) ABSTRACT

A articulation mechanism for a motor vehicle seat is disclosed. The mechanism may include a first end-plate, a second end-plate mounted so as to pivot relative to the first end-plate about a main axis of rotation, locking elements comprising a first locking element and a second locking element that can be moved between an active position and an inactive position, a cam that can be moved between a locked position in which it holds the locking elements in the active position and an unlocked position in which it holds the second locking element in the inactive position, guide elements capable of guiding in rotation each of the locking elements, and a bearing surface preventing the first locking element, but not the second locking element, from being in the active position in a range of angular tilting positions.

10 Claims, 5 Drawing Sheets

ARTICULATION MECHANISM WITH PIVOTING LOCKING ELEMENTS FOR A VEHICLE SEAT AND A SEAT COMPRISING SUCH A MECHANISM

CROSS-REFERENCE TO RELATED APPLICATIONS

This application claims priority under the Paris Convention to French Patent Application No. 08 50763, filed on Feb. 6, 2008.

FIELD OF THE DISCLOSURE

The invention relates to a single-stage articulation mechanism for a motor vehicle seat.

BACKGROUND OF THE INVENTION DISCLOSURE

Document WO0006414 discloses such an articulation mechanism comprising:
 a first end-plate,
 a second end-plate mounted so as to pivot relative to the first end-plate about a main axis of rotation and comprising a ring gear,
 a plurality of locking elements comprising at least a first locking element and a second locking element, each of the said locking elements comprising teeth capable of interacting with the teeth of the ring gear and being able to move between:
  an active position in which the teeth of each of the locking elements interact with the teeth of the ring gear, in order to prevent rotation between the first end-plate and the second end-plate about the main axis of rotation,
  an inactive position in which the teeth of each of the locking elements are separated from the teeth of the ring gear, in order to allow rotation between the first end-plate and the second end-plate about the main axis of rotation,
 a cam that can be moved between a locked position in which it holds the locking elements in the active position and an unlocked position in which it allows the inactive position of the locking elements,
 guide elements secured to the first end-plate and capable of guiding in rotation each of the locking elements relative to the first end-plate about a respective secondary axis of rotation parallel to the main axis of rotation,
 a bearing surface secured to the second end-plate preventing the first locking element from being in the active position in a range of angular tilting positions of the first end-plate relative to the second end-plate.

SUMMARY OF THE DISCLOSURE

In order to improve this mechanism, the invention proposes that the bearing surface does not prevent the second locking element from being in the active position in the range of angular tilting positions and the cam is preferably suitable for holding the second locking element in the inactive position when it is in the unlocked position.

This prevents the amplitude of the range of angular tilting positions and the amplitude of the angular positions in which the bearing surface allows the active position of the first locking element from having a periodicity corresponding to a fraction of a revolution equal to the inverse of the number of locking elements. In addition, it prevents the second locking element from rubbing unexpectedly against the teeth of the ring gear, notably in the range of angular tilting positions.

According to another feature according to the invention, the articulation mechanism also comprises a third locking element identical to the second locking element, the cam being suitable for holding the third locking element in the inactive position when it is in the unlocked position, the second locking element and the third locking element not interacting with the bearing surface.

Therefore, the range of angular tilting positions may be chosen over at least 180 degrees (theoretically over 360 degrees) without limitation of periodicity in order to allow movement from a laid-back position to a folded-down position, while offering great strength because of the presence of at least three locking elements.

According to another feature, preferably the second element has an unlocking finger and the cam has a hook capable of interacting with the unlocking finger to hold the second locking element in the inactive position when the cam is in the unlocked position.

This solution is simple, robust and reliable.

According to yet another complementary feature according to the invention, the hook has a retention surface extending radially slantwise and delimits a slot open towards the periphery of the cam, the said retention surface being capable of coming into contact with the unlocking finger of the second locking element when the second locking element is in the active position in order to bring the second locking element into the inactive position when the cam passes from its locked position to its unlocked position.

Therefore, all the user has to do is to rotate the cam by acting on a control lever to bring the second locking element into the inactive position. It is then sufficient for him to pivot the seat elements relative to one another until he brings the first end-plate and the second end-plate into the range of angular tilting positions in order to be able to pivot the seat elements relative to one another, even if he releases the control lever.

According to yet another feature according to the invention, preferably the cam comprises another hook having a retention surface extending radially slantwise and delimits a slot open towards the periphery of the cam, the said retention surface of the other hook being capable of coming into contact with the unlocking finger of the first locking element when the first locking element is in the active position in order to bring the first locking element into the inactive position when the cam passes from its locked position to its unlocked position.

This prevents the first locking element from rubbing unexpectedly against the teeth of the ring gear.

According to another feature according to the invention, preferably the cam is supported by a shaft passing through a first passageway arranged in the first end-plate and a second passageway arranged in the second end-plate, and the shaft has a clearance of less than 0.4 millimetre relative to at least one of the first and second passageway.

This ensures that the shaft is properly guided in rotation about the main axis of rotation, including in the range of angular tilting positions.

Preferably, the shaft has a clearance ranging between 0.1 millimetre and 0.4 millimetre relative to the first passageway and to the second passageway.

According to another feature according to the invention, the cam does not extend axially between the locking elements and the first end-plate or between the locking elements and the second end-plate.

Therefore, the articulation mechanism is simpler to produce, more robust and more compact.

According to another feature according to the invention, the guide elements comprise:
- a first bore extending along the secondary axis of rotation of the first locking element and receiving a circular pin secured to the first element, and
- a second bore extending along the secondary axis of rotation of the second locking element and receiving a circular pin secured to the second element.

This simple and robust embodiment ensures satisfactory rotational guidance of the locking elements about their secondary axis of rotation relative to the first end-plate.

According to yet another feature according to the invention, the first locking element has a nipple protruding relative to a main portion of the first locking element in the direction of the main axis of rotation and interacting with the bearing surface, the bearing surface being offset relative to the main portion of the first locking element in the direction of the main axis of rotation.

The invention also relates to a vehicle seat comprising a squab and a back connected together by at least one articulation mechanism.

BRIEF DESCRIPTION OF THE DRAWINGS

Other features and advantages of the present invention will appear in the following detailed description making reference to the appended drawings in which.

MORE DETAILED DESCRIPTION

In the various figures, the same reference numbers designate identical or similar elements.

Figure 1:
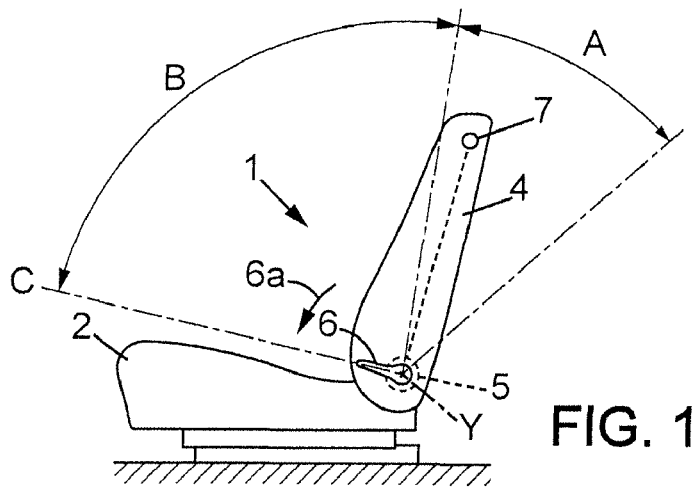
FIG. 1 is a schematic view of a seat the back of which can be adjusted in inclination by means of at least one articulation mechanism according to an embodiment according to the invention.
Figure 2:
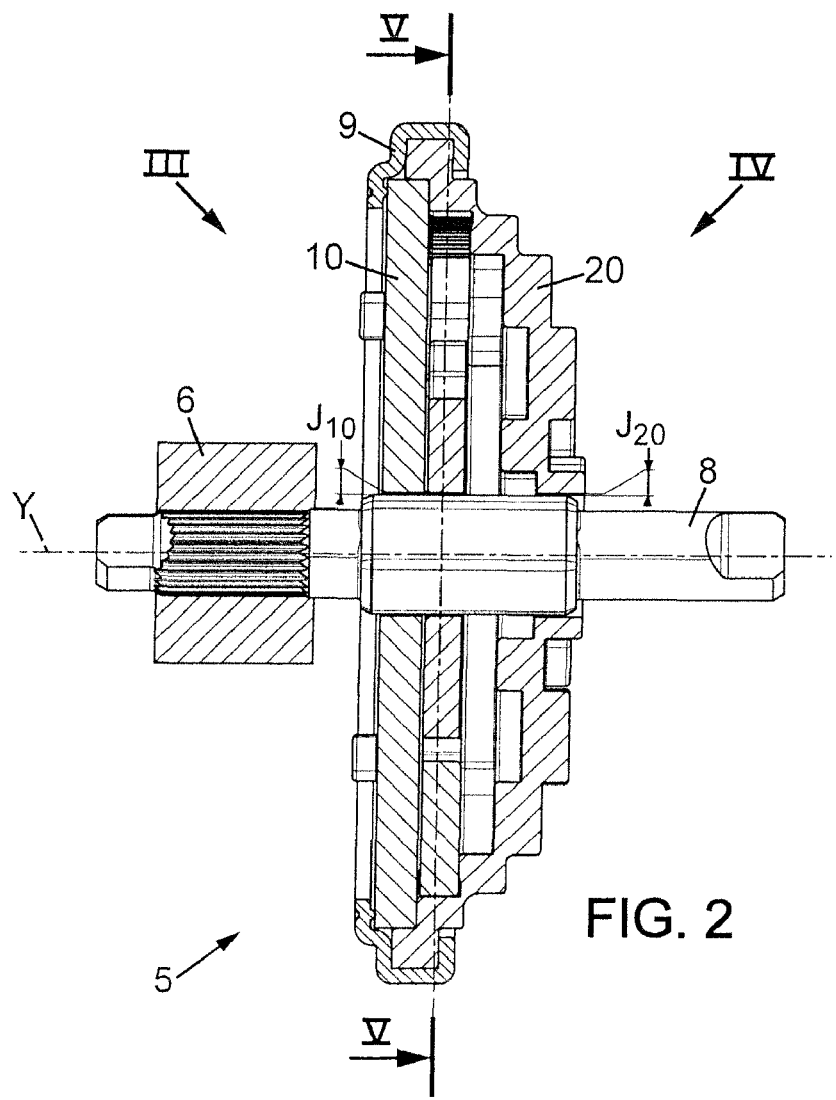
FIG. 2 represents the articulation mechanism seen in section along the line marked II-II in FIG. 5.
Figure 3:
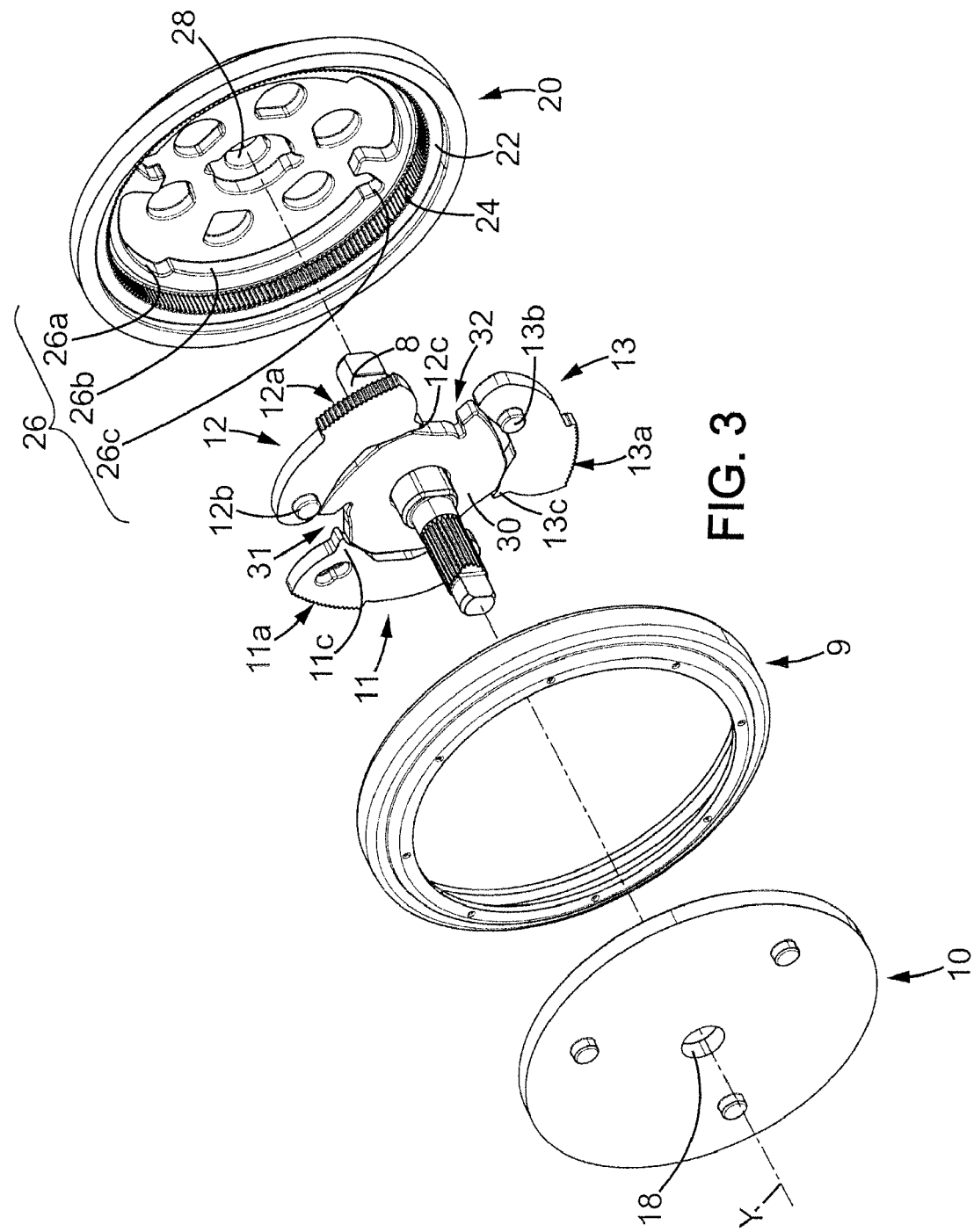
FIG. 3 is an exploded view in the direction of the arrow marked III in FIG. 2.
Figure 4:
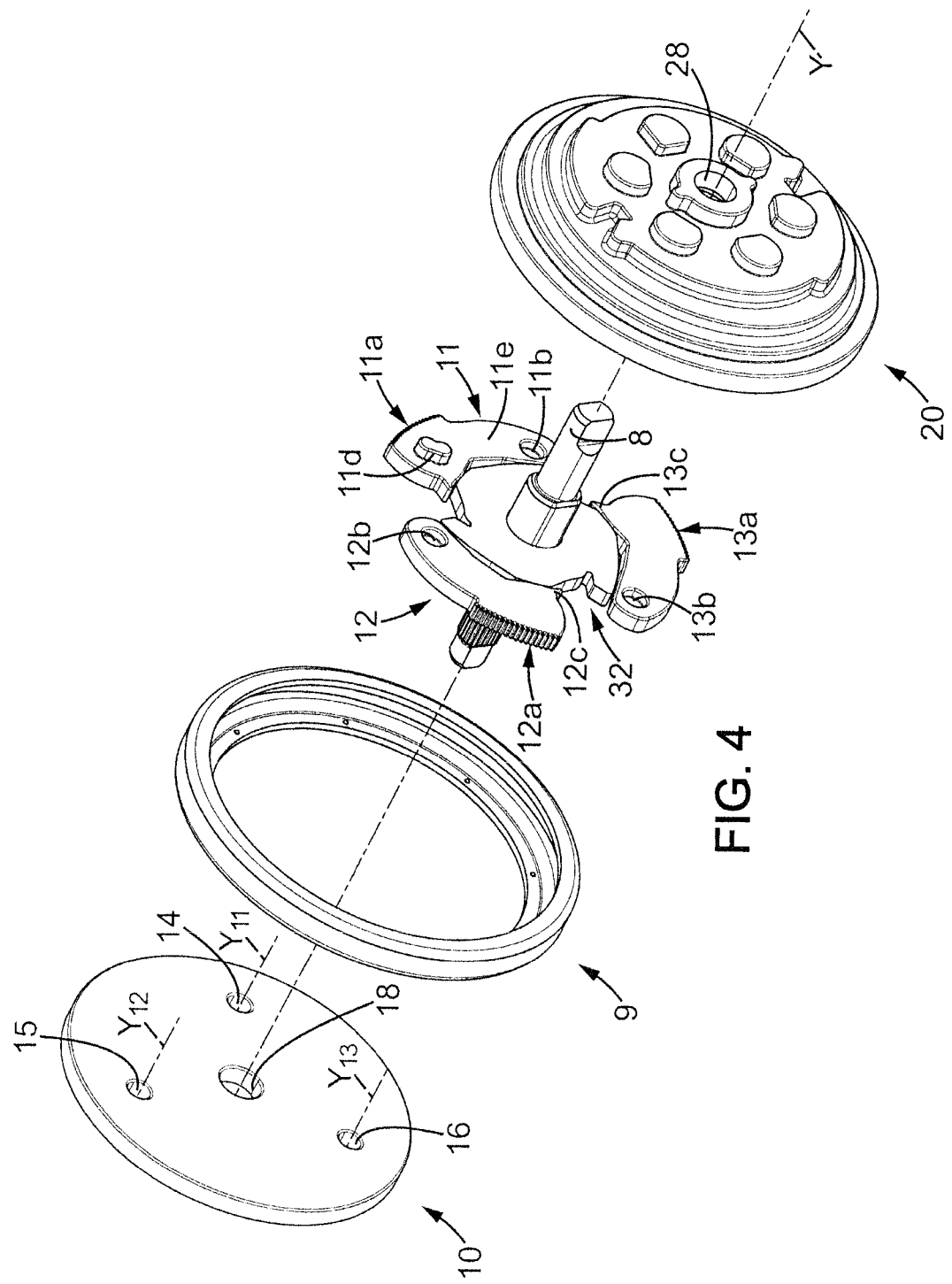
FIG. 4 is an exploded view in the direction of the arrow marked IV in FIG. 2.

As shown schematically in FIG. 1, the invention relates to a vehicle seat 1 which comprises, on the one hand, a squab 2 mounted on a vehicle floor 3 and, on the other hand, a back 4 mounted so as to pivot on the squab 2 by means of at least one articulation mechanism 5, about a main articulation axis Y extending transversely and being substantially horizontal.

The articulation mechanism 5 has a single stage and may be controlled for example by means of a lever 6 which may be actuated in the direction 6a to release the back 4 by pivoting about the main axis of rotation Y.

The back 4 may also comprise an additional operating member 7, such as a lever or similar element, preferably placed in the upper portion of the back 4 and connected to the articulation mechanism 5 preferably via a cable.

As illustrated in FIGS. 2 to 5, the articulation mechanism 5 essentially comprises a first end-plate 10, a second end-plate 20, a metal ring 9, three locking elements 11,12,13, a cam 20 and a control shaft 8.

The first end-plate 10 is in the general shape of a rigid disc which is attached in this embodiment to the squab 2 of the seat. It comprises a bore extending along the main axis of rotation Y and forming a passageway 18 for the shaft 8, and three bores 14, 15, 16 of cylindrical shape each extending along a respective secondary axis of rotation $Y_{11}, Y_{12}, Y_{13}$, parallel to the main axis of rotation Y.

The second end-plate 20 has the general shape of a rigid disc which is attached in this embodiment to the back 4. It comprises a ring gear 22 furnished with teeth 24, a bearing surface 26 and a cylindrical bore of circular section extending along the main axis of rotation Y and forming a passageway 28 for the shaft 8. The bearing surface 26 comprises a first circular portion 26a centred on the main axis of rotation Y, a second circular portion 26b also centred on the main axis of rotation Y but with a smaller radius that that of the first circular portion 26a, and a recessed portion 26c.

The metal ring 9 is swaged onto the periphery of the first end-plate 10 and of the second end-plate 20, allowing a relative pivoting between these two end-plates about the main axis of rotation Y.

Figure 5:
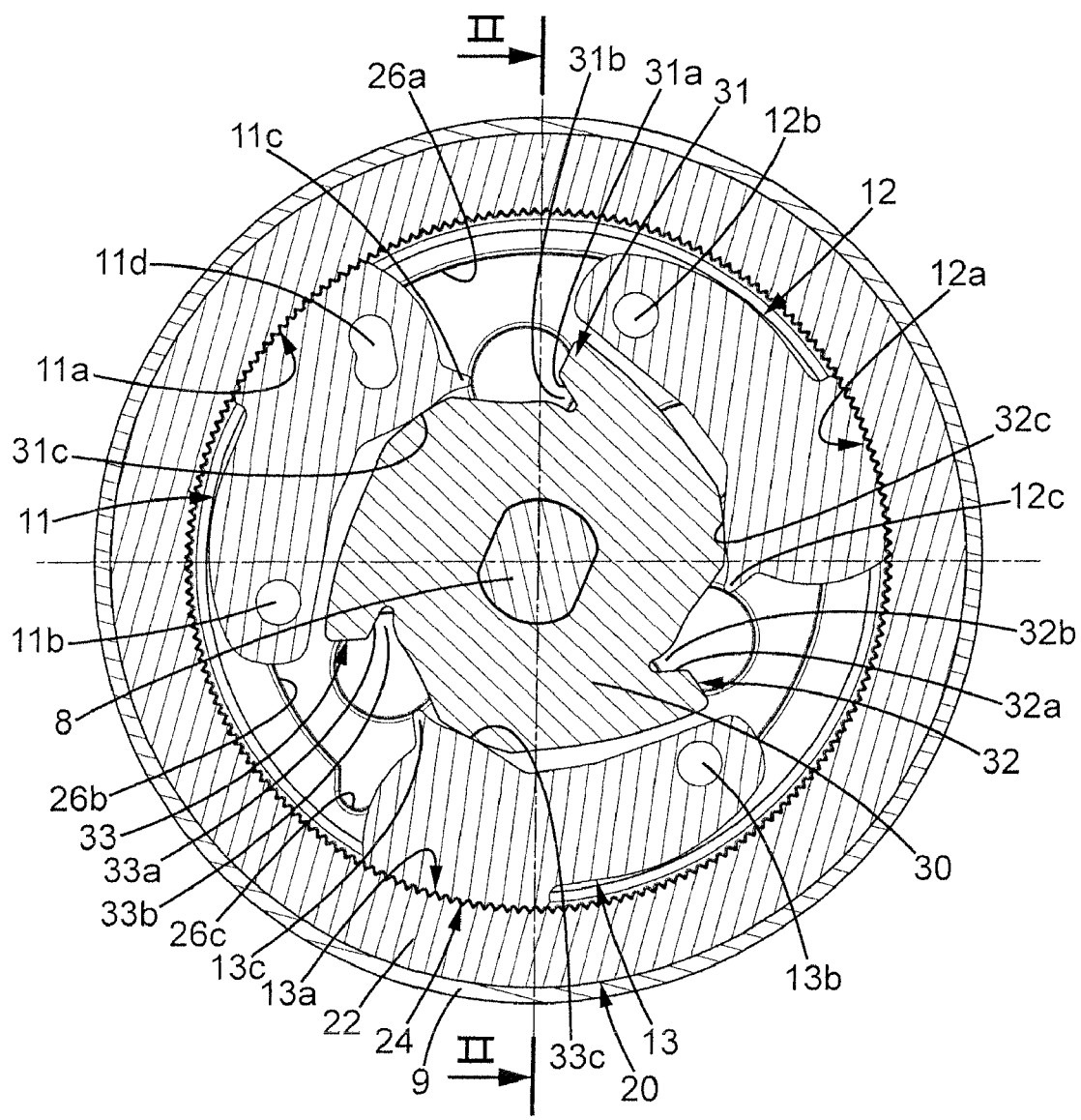
FIG. 5 is a view in section along the line marked V-V in Figure II, in the locked position of the mechanism.

The locking elements 11, 12, 13 are placed evenly (at 120°) in the first end-plate 10. They each comprise teeth 11a, 12a, 13a, a pin 11b, 12b, 13b, and a finger 11c, 12c, 13c. The pins 11b, 12b, 13b are cylindrical of circular section. They extend along the respective secondary axes of rotation $Y_{11}, Y_{12}, Y_{13}$ and are received in the corresponding bores 14, 15, 16 of the first end-plate 10. The interaction between the pins 11b, 12b, 13b and the bores 14, 15, 16 allows the locking elements 11, 12, 13 to pivot about their respective secondary axis $Y_{11}, Y_{12}, Y_{13}$ between an active position and an inactive position. In the active position of the locking elements, the teeth 11a, 12a, 13a interact with the teeth 24 of the ring gear 22, as illustrated in FIG. 5, in order to prevent rotation between the first end-plate 10 and the second end-plate 20 about the main axis of rotation Y. In the inactive position of the locking elements, as illustrated in FIG. 6, the teeth 11a, 12a, 13a are separated from the teeth 24 of the ring gear 22, which allows free rotation between the first end-plate 10 and the second end-plate 20 about the main axis of rotation Y.

The cam 30 has three hooks 31, 32, 33 and three bearing surfaces 31c, 32c, 33c designed to interact with each of the respective locking elements 11, 12, 13. Each hook 31, 32, 33 comprises a retention surface 31a, 32a, 33a extending radially slantwise and delimits a slot 31b, 32b, 33b open towards the periphery of the cam 30.

Figure 6:
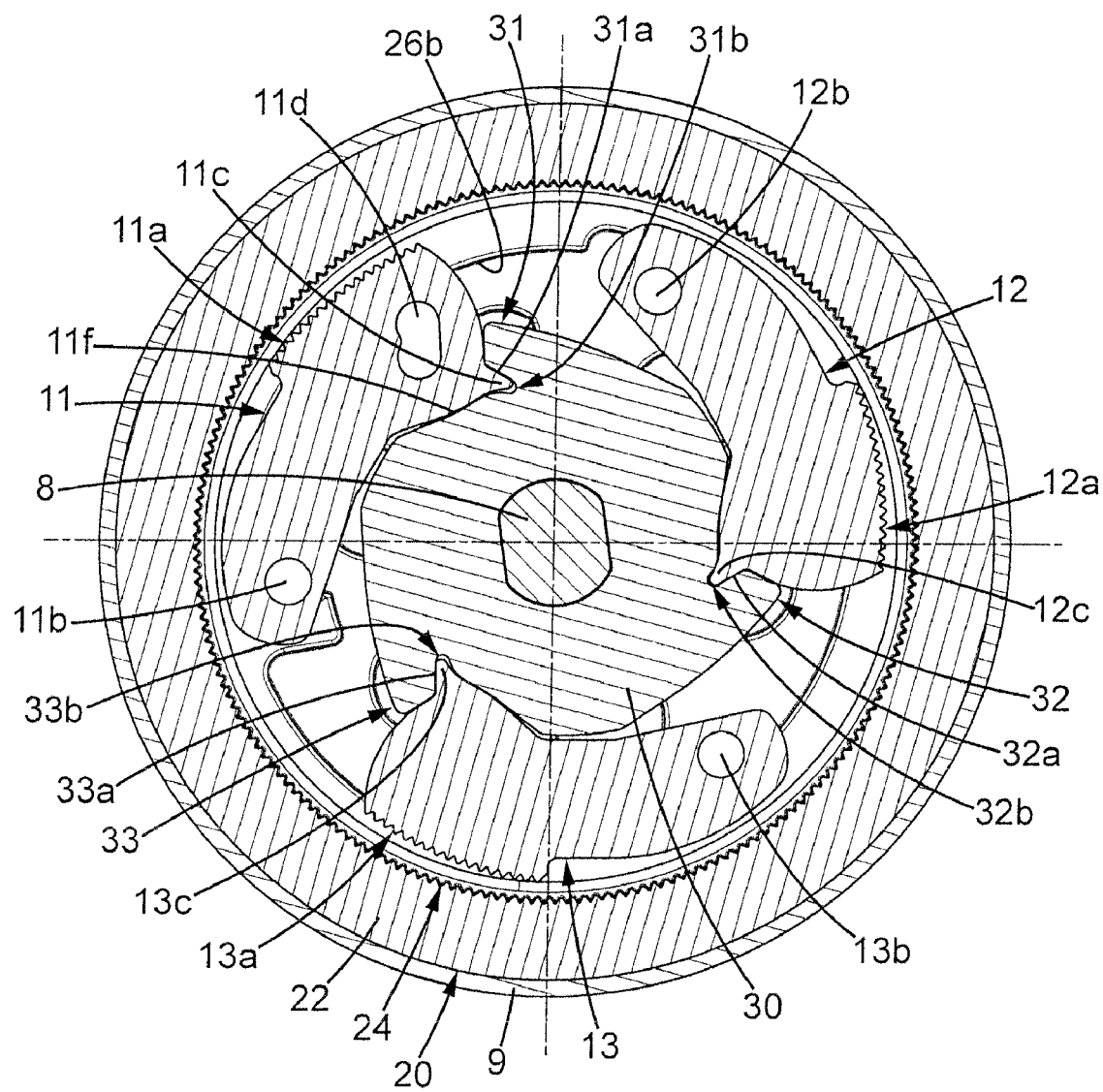
FIG. 6 is a view according to FIG. 5, in the unlocked position of the mechanism.

The cam 30 is secured to the shaft 8 and is able to move in rotation about the main axis of rotation Y between a locked position illustrated in FIG. 5 and an unlocked position illustrated in FIG. 6. A spring (not shown) tends to return the cam 30 to the unlocked position. In the locked position, the cam presses on each of the locking elements 11, 12, 13, by means of the bearing surfaces 31c, 32c, 33c, in order to hold the locking elements in the active position. When the cam pivots from its locked position to its unlocked position, each of its retention surfaces 31a, 32a, 33a interacts with the finger 11c, 12c, 13c of a respective pin 11, 12, 13 to bring the said respective pin into the inactive position gradually as the finger 11c, 12c, 13c is inserted into the respective slot 31b, 32b, 33b.

The cam 30 interacts with the locking elements 11, 12, 13 in a plane extending perpendicularly to the main axis of rotation Y so that the cam 30 does not extend in the direction of the main axis of rotation Y between the locking elements 11, 12, 13 and the first end-plate 10, or between the locking elements 11, 12, 13 and the second end-plate 20, but interacts radially to the main axis of rotation Y with the locking elements 11, 12, 13.

The locking element 11, and only that element, also has a nipple 11d protruding relative to a main portion 11e in the direction of the main axis of rotation Y. The nipple 11d is designed to interact with the bearing surface 26. Since the said bearing surface 26 is offset relative to the main portion 11e of the first locking element 11 in the direction of the main axis of rotation Y, it does not interfere with the rotation of the other locking elements 12, 13 between their active position and their inactive position. On the other hand, when the nipple 11d of the locking element 11 is facing the second portion 26b of the bearing surface 26, the said bearing surface 26 acts on the nipple 11d to prevent the locking element 11 from leaving its inactive position.

The locking element 11 has a bearing surface 11f which comes into contact with the cam 30 when the locking element 11 is in the inactive position, to prevent the cam 30 from leaving its unlocked position, thereby keeping the locking elements 12, 13 in their inactive position.

The second portion 26b of the bearing surface 26 consequently determines a range B of angular tilting positions indicated in FIG. 1, in which the user can freely pivot the second end-plate 20 relative to the first end-plate 10, in other words the back 4 relative to the squab 2 without having to act on one of the levers 6, 7. The range B of angular tilting positions extends continuously preferably over at least 90°, and in the embodiment illustrated over approximately 100°.

In order to prevent the shaft 8 from moving out of alignment relative to the main axis of rotation Y, when the nipple 11d is pressing against the portion 26b of the bearing surface 26 and the bearing surface 11f presses on the cam 30, the shaft 8 advantageously has a diametral clearance $J_{10}$ relative to the passageway 18 in the first end-plate 10 and a diametral clearance $J_{20}$ relative to the passageway 28 in the second end-plate 20 preferably ranging between 0.1 and 0.4 mm.

When the nipple 11d is facing the first portion 26a of the bearing surface 26, the back 4 is in a range A of angular locking positions, indicated in FIG. 1. This range A of consecutive angular locking positions extends continuously preferably over at least 30°, and in the example illustrated over approximately 45°. The back 4 is then between a substantially vertical position and a substantially laid-back position.

In this range A of angular locking positions, the user can adjust the position he desires, after having unlocked the articulation mechanism, for example by acting on the control lever 6 in the direction of the arrow marked 6a, and then immobilize the back 4 in the desired position by releasing the control lever. Specifically, in this range A of angular locking positions, since the nipple 11d is facing the first portion 26a, the locking element 11 is not prevented from coming into an active position, other than by the hook 31 of the cam 30, so that, when the user ceases to act on the lever 6, the spring (not shown) returns the cam 30 to the locked position, which brings the locking elements 11, 12, 13 to their active position.

In FIG. 1, the back 4 is in the range A of angular locking positions, close to the substantially vertical position constituting the limit with the range B of angular tilting positions.

When the nipple 11d is facing the recessed portion 26c of the bearing surface 26, the back 4 is in a folded-down position C on the squab 2, as illustrated in FIG. 1, so that the back 4 can be held in this position by locking the articulation mechanism 5.

The range A of angular locking positions, the range B of angular tilting positions and the tilted position C of the back 4 relative to the squab 2, illustrated in FIG. 1, extend continuously and consecutively, and correspond respectively to the portions 26a, 26b, 26c of the bearing surface 26. They extend in total, in the embodiment illustrated, over approximately 120 degrees, but could extend notably over 180 degrees if it is desired to obtain a sleeper-seat position, or even close to 360° if necessary, with the freedom to choose the extent of the range A of angular locking positions and the range B of angular tilting positions.

The invention claimed is:

1. An articulation mechanism for a motor vehicle seat comprising:
    a first end-plate,
    a second end-plate mounted so as to pivot relative to the first end-plate about a main axis of rotation and comprising a ring gear having teeth,
    a plurality of locking elements comprising at least a first locking element and a second locking element, each of the said locking elements comprising teeth capable of interacting with the teeth of the ring gear and being able to be moved between:
        an active position in which the teeth of each of the locking elements interact with the teeth of the ring gear, in order to prevent rotation between the first end-plate and the second end-plate about the main axis of rotation,
        an inactive position in which the teeth of each of the locking elements are separated from the teeth of the ring gear, in order to allow rotation between the first end-plate and the second end-plate about the main axis of rotation,
    a cam that can be moved between a locked position in which it holds the locking elements in the active position and an unlocked position in which it allows the inactive position of the locking elements,
    guide elements secured to the first end-plate and capable of guiding in rotation each of the locking elements relative to the first end-plate about a respective secondary axis of rotation parallel to the main axis of rotation,
    a bearing surface secured to the second end-plate preventing the first locking element from being in the active position in a range of angular tilting positions of the first end-plate relative to the second end-plate,
    wherein the first locking element has a nipple protruding relative to a main portion of the first locking element in the direction of the main axis of rotation and interacting with the bearing surface, the bearing surface is offset relative to the main portion of the first locking element in the direction of the main axis of rotation, the bearing surface does not prevent the second locking element from being in the active position in the range of angular tilting positions and the cam is suitable for holding the second locking element in the inactive position when it is in the unlocked position.

2. The articulation mechanism according to claim 1, also comprising a third locking element identical to the second locking element, the cam being suitable for holding the third locking element in the inactive position when it is in the unlocked position, the second locking element and the third locking element not interacting with the bearing surface.

3. The articulation mechanism according to claim 1, wherein the second locking element has an unlocking finger and the cam has a hook capable of interacting with the unlocking finger in order to hold the second locking element in the inactive position when the cam is in the unlocked position.

4. The articulation mechanism according to claim 3, wherein the cam has a periphery and the hook has a retention surface extending radially slantwise and delimits a slot open towards the periphery of the cam, the said retention surface being capable of coming into contact with the unlocking finger of the second locking element when the second locking element is in the active position in order to bring the second locking element into the inactive position when the cam passes from its locked position to its unlocked position.

5. The articulation mechanism according to claim 4, wherein the cam comprises another hook having a retention surface extending radially slantwise and delimits a slot open towards the periphery of the cam, the said retention surface of the other hook being capable of coming into contact with the unlocking finger of the first locking element when the first locking element is in the active position in order to bring the first locking element into the inactive position when the cam passes from its locked position to its unlocked position.

6. The articulation mechanism according to claim 1, wherein the cam is supported by a shaft passing through a first passageway arranged in the first end-plate and a second passageway arranged in the second end-plate, and the shaft has a clearance of less than 0.4 millimeter relative to at least one of the first passageway and second passageway.

7. The articulation mechanism according claim 6, wherein the shaft has a clearance ranging between 0.1 millimeter and 0.4 millimeter relative to the first passageway and to the second passageway.

8. The articulation mechanism according to claim 1, wherein the cam does not extend axially between the locking elements and the first end-plate or between the locking elements and the second end-plate.

9. The articulation mechanism according to claim 1, wherein the guide elements comprise:
   a first bore extending along the secondary axis of rotation of the first locking element and receiving a circular pin secured to the first locking element, and
   a second bore extending along the secondary axis of rotation of the second locking element and receiving a circular pin secured to the second locking element.

10. A vehicle seat comprising a squab and a back connected together by at least one articulation mechanism according to claim 1.

\* \* \* \* \*